United States Patent
Chen et al.

(10) Patent No.: US 12,021,962 B2
(45) Date of Patent: Jun. 25, 2024

(54) TWO-STAGE IP DE-JITTER ALGORITHM IN A MULTIPLEXER FOR A GROUP OF STATISTICALLY MULTIPLEXED SINGLE PROGRAM TRANSPORT STREAMS

(71) Applicant: ARRIS Enterprises LLC, Suwanee, GA (US)

(72) Inventors: Jing Yang Chen, San Diego, CA (US); Robert S. Nemiroff, Carlsbad, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 26 days.

(21) Appl. No.: 17/203,463

(22) Filed: Mar. 16, 2021

(65) Prior Publication Data

US 2021/0211268 A1    Jul. 8, 2021

Related U.S. Application Data

(63) Continuation of application No. 16/268,485, filed on Feb. 5, 2019, now Pat. No. 10,951,390.

(60) Provisional application No. 62/626,275, filed on Feb. 5, 2018.

(51) Int. Cl.
*H04L 7/033* (2006.01)
*H04L 43/106* (2022.01)

(52) U.S. Cl.
CPC .......... *H04L 7/033* (2013.01); *H04L 43/106* (2013.01)

(58) Field of Classification Search
CPC ................................ H04L 7/033; H04L 12/26
USPC ............................................................. 370/350
See application file for complete search history.

(56) References Cited

U.S. PATENT DOCUMENTS

| | | | | |
|---|---|---|---|---|
| 5,640,388 A * | 6/1997 | Woodhead | ....... | H04N 21/23608 |
| | | | | 375/E7.269 |
| 5,652,627 A * | 7/1997 | Allen | ................ | H04N 21/242 |
| | | | | 725/100 |
| 6,345,079 B1 * | 2/2002 | Ohishi | ............... | H04N 21/4305 |
| | | | | 375/E7.278 |
| 6,433,599 B2 * | 8/2002 | Friedrich | ............... | H04L 7/033 |
| | | | | 327/156 |
| 6,493,832 B1 * | 12/2002 | Itakura | ............. | H04N 21/64307 |
| | | | | 713/400 |
| 6,693,921 B1 * | 2/2004 | Whitfield | ................. | H04L 47/10 |
| | | | | 370/516 |
| 7,130,368 B1 * | 10/2006 | Aweya | ................... | H03L 7/0992 |
| | | | | 713/400 |
| 7,376,158 B2 * | 5/2008 | Woodward, Jr. | .... | H04N 21/4305 |
| | | | | 375/E7.278 |
| 7,511,762 B2 * | 3/2009 | Elnathan | ................... | H04N 5/06 |
| | | | | 348/537 |
| 7,656,948 B2 * | 2/2010 | Seong | .................. | H04N 21/242 |
| | | | | 370/236 |

(Continued)

*Primary Examiner* — Man U Phan
(74) *Attorney, Agent, or Firm* — Chernoff, Vilhauer, McClung & Stenzel, LLP

(57) ABSTRACT

A system and method are provided for encoding and decoding multiplexed video signals to de-jitter the content. A first de-jitter operation is performed on incoming signals and a second de-jitter operation is performed on PCR modified outbound packetized signals after sequencing of the packetized signals has been determined. In one case the second de-jitter operation can be performed using a PLL that is based, at least in part, on the output hardware limitations.

3 Claims, 9 Drawing Sheets

(56) References Cited

U.S. PATENT DOCUMENTS

| | | | | |
|---|---|---|---|---|
| 7,657,645 B2 * | 2/2010 | Xu | H04L 65/65 | 709/204 |
| 7,710,965 B2 * | 5/2010 | Liu | H04N 21/43072 | 375/354 |
| 7,778,173 B2 * | 8/2010 | Tse | H04N 21/64322 | 370/230.1 |
| 7,826,581 B1 * | 11/2010 | Prather | H04L 7/0337 | 375/376 |
| 7,873,134 B2 * | 1/2011 | Kurd | H03L 7/23 | 375/376 |
| 7,957,423 B2 * | 6/2011 | Crookes | H04N 21/2383 | 370/474 |
| 8,107,494 B2 * | 1/2012 | Sticht | H04J 3/076 | 370/372 |
| 8,130,777 B2 * | 3/2012 | Friedman | H04J 3/0697 | 710/25 |
| 8,139,704 B2 * | 3/2012 | Heinrich | H04N 21/242 | 375/376 |
| 8,160,093 B2 * | 4/2012 | Chapman | H04N 21/239 | 370/503 |
| 9,059,811 B2 * | 6/2015 | Huang | H04J 3/0682 | |
| 9,094,732 B2 * | 7/2015 | Lerner | H04N 21/4344 | |
| 9,106,948 B2 * | 8/2015 | Brouillette | H04N 21/4305 | |
| 9,369,270 B1 * | 6/2016 | Spijker | H04J 3/0667 | |
| 9,444,470 B2 * | 9/2016 | Milijevic | H03L 7/087 | |
| 9,948,578 B2 * | 4/2018 | Subasingha | H04L 65/70 | |
| 10,277,922 B2 * | 4/2019 | Yang | H04N 21/647 | |
| 10,951,390 B2 * | 3/2021 | Chen | H04N 21/4383 | |
| 11,057,653 B2 * | 7/2021 | Nemiroff | H04N 21/23655 | |
| 11,245,406 B2 * | 2/2022 | Ranganathan | H03L 7/23 | |
| 11,528,521 B2 * | 12/2022 | Neugeboren | H04N 21/23406 | |
| 11,533,526 B2 * | 12/2022 | Garvey | H04N 21/44004 | |
| 2002/0044620 A1 * | 4/2002 | Spijker | H03L 7/085 | 327/147 |
| 2002/0080900 A1 * | 6/2002 | Ohishi | H04N 21/4305 | 375/E7.278 |
| 2006/0146815 A1 * | 7/2006 | Tse | H04N 21/64322 | 370/473 |
| 2009/0007201 A1 * | 1/2009 | Eerenberg | H04N 21/242 | 375/E7.278 |
| 2023/0084459 A1 * | 3/2023 | Garvey | H04N 21/23406 | |

* cited by examiner

TWO-STAGE IP DE-JITTER ALGORITHM IN A MULTIPLEXER FOR A GROUP OF STATISTICALLY MULTIPLEXED SINGLE PROGRAM TRANSPORT STREAMS

CROSS-REFERENCE TO RELATED APPLICATION

This present application is a continuation of U.S. patent application Ser. No. 16/268,485 filed Feb. 5, 2019, now U.S. Pat. No. 10,951,390, which claims the benefit of priority to prior-filed provisional patent application Ser. No. 62/626,275, filed Feb. 5, 2018, the complete contents of both of which are incorporated herein by reference.

BACKGROUND

Technical Field

The present device relates to the field of multiplexed signal transmission and more specifically to de-jitter applications in a statistical multiplexed system.

Related Art

The user of statistical multiplexed (Mux) signals in data transmission is generally well understood. However, in video applications and in application where signal reconstruction is time dependent or time critical to avoid signal disruption or interruption, multiplexed systems are faced with various constraints on data packet delivery spacing and with issues related to synchronization of data packets with a reference clock. Various de-jitter techniques exist to ensure signal quality at the recipient device. However, such existing systems can cause the output multiplexed bandwidth to exceed the allowed bandwidth for the statistical multiplex group or cause excessive delay in the delivery time of the multiplexed stream, resulting in a video component arriving too late.

What is needed is a two-stage IP de-Jitter algorithm in a multiplexer for a group of statistically multiplexed single program transport streams.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect comprises receiving a plurality of input signals each including a plurality of packets wherein system also includes performing a first de-jitter operation on each of said plurality of input signals. The system can also include determining a sequence for encoding said plurality of packets from each of said plurality of input signals into a multiplexed signal and can also include determining whether any of said plurality of input signals is to be encoded incorporating a program clock reference. In some embodiments, the system can further include applying a program clock reference correction to each input signal that is to be encoded incorporation said program clock reference and further include performing a second de-jitter operation on each of said input signals to which said program clock reference correction is applied. Furthermore, the system can include combining said plurality of packets of each of said input signals based at least in part on said sequence for encoding. Other embodiments of this aspect include corresponding computer systems, apparatus, and computer programs recorded on one or more computer storage devices, each configured to perform the actions of the methods.

Implementations can include one or more of the following features: wherein said first de-jitter operation modifies an input time stamp; wherein said first de-jitter operation is accomplished using a first phase locked loop; wherein said second de-jitter operation is accomplished using a second phase locked loop; wherein said second phase locked loop is based at least in part on output hardware associated with an output schedule time for said input signals to which said program clock reference has been applied; and wherein said second de-jitter operation modifies said input signal based at least in part on said sequence for encoding. Implementations of the described techniques may include hardware, a method or process, or computer software on a computer-accessible medium.

BRIEF DESCRIPTION OF THE DRAWINGS

Further details of the present device are explained with the help of the attached drawings in which.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Disclosed herein is a single process multiplexing system with multiple threads. As further disclosed, in some embodiments all threads can run in the same virtual memory space with each thread having its own stack segment and where data segments and heap segments are shared among the threads.

Synchronizations among multiplexed (Mux) threads can be fulfilled through ring buffers, link lists, and time stamps wherein transport packets can be sorted in the link lists. Transport packets can then be pushed in or popped out the ring buffers according to the scheduled times.

In some embodiments, threads can be prioritized and scheduled in a round robin fashion and all threads can run in a 1 ms timer period. However, in alternate embodiments any known, convenient and/or desired timer period can be employed. Ring buffers can be used to absorb the jitters of network delay and Linux server scheduler latency. The sizes of the ring buffers can be predefined to handle the maximum jitters. Thus, in some embodiments, no mutexes and condition variables are used (the fullness of the ring buffers are atomic variables). In some situations in which maximum jitters are exceeded, ring buffers can be full, old packets can be dropped to make room for the new packets. The Mux disclosed herein is adapted and configured to handle 300 ms network delays and 20 ms Linux scheduler latency.

Figure 1:
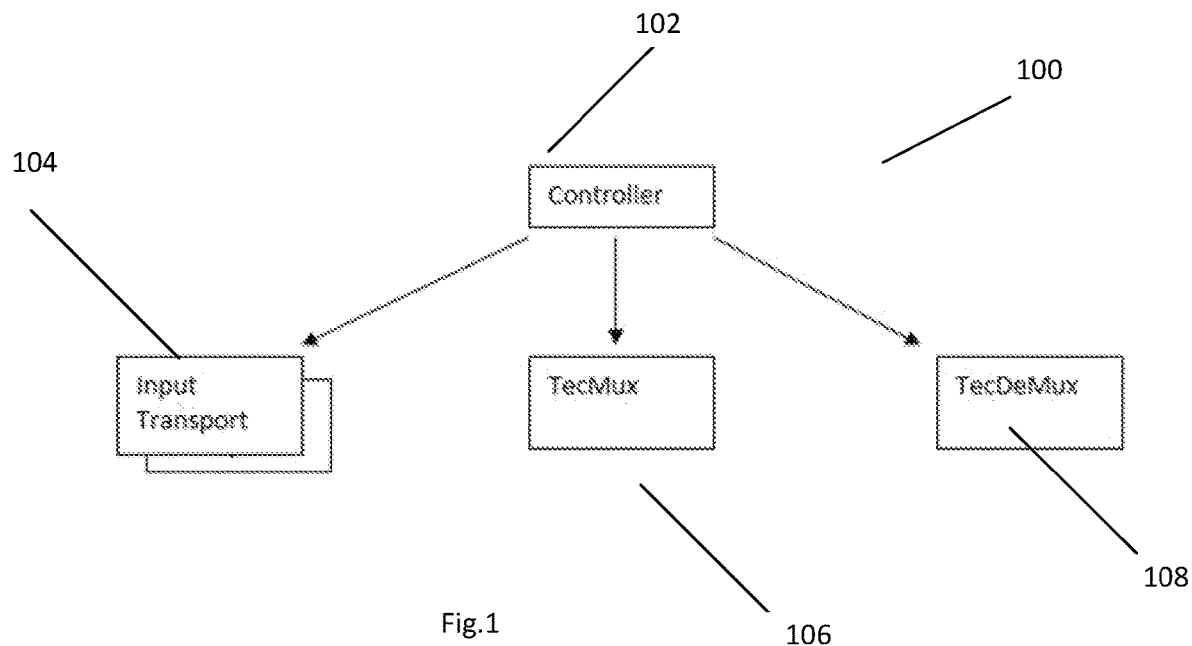
FIG. 1 depicts a high-level of a Mux control system.

FIG. 1 depicts a high-level of a Mux control system 100 comprising a controller 102, an input transport thread 104 instantiated in memory, a TecMux thread 106 instantiated in memory and a TecDeMux thread 108 instantiated in memory. Controller 102 can create or instantiate one or more Input Transport threads 104, one or more TecMux threads 106, and one or more TecDeMux threads 108. Additionally, in some embodiments, the controller 102 can allocate a video TEC (Transport Encryption Card) transport packets ring buffer and an audio TEC transport packets ring buffer for each output programs and the controller thread 102 can also create a TEC transport packets ring buffer for the TecDeMux thread 108 and a vector for the TecMux thread 106.

In operation the controller 102 can send one or more configurations to the Input Transport threads 104, TecMux threads 106, and TecDeMux threads 108 through message queues and or any other known, convenient and/or desired system.

Figure 2:
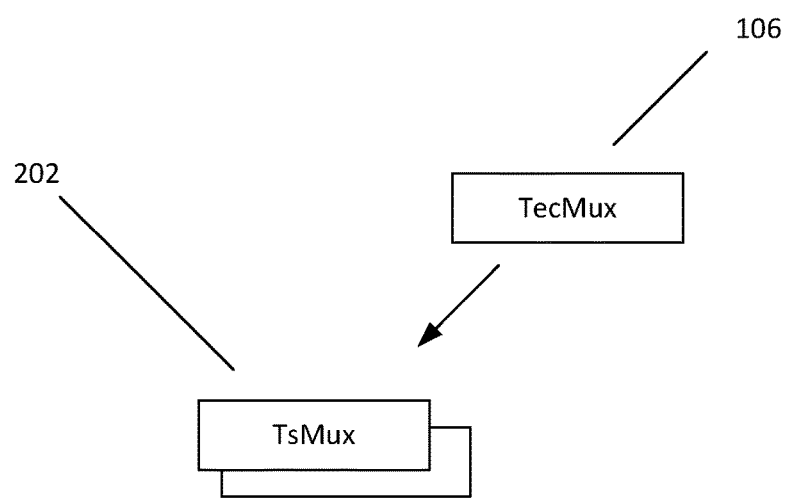
FIG. 2 depicts a high-level view of a packet generation system.

FIG. 2 depicts a high-level view of TecMux thread 106. TecMux thread 106 can create TsMux threads 202. TecMux thread 106 can allocate, provision or instantiate a NULL TEC transport packets ring buffer, a PCR only TEC transport packets ring buffer, and/or a SI (service information) table TEC transport packets ring buffer for each TsMux thread 202. TecMux thread 106 can also create a link list for each TsMux thread 202 wherein the TsMux thread 202 can sort the transport packets in the link list.

TecMux thread(s) 106 can relay configuration(s) from Controller 102 to TsMux threads 202. Additionally, in some embodiments, TecMux thread(s) 106 can write TEC transport packets to the TEC card based on scheduled times. In some embodiments, TecMux thread(s) can use non-blocking write. However, in alternate embodiments, any known, convenient and/or desired communication system or method can be employed. If TEC driver is unable to accept data, TecMux thread 106 can drop the TEC transport packets to minimize date flow interruption and/or keep data flow uninterrupted. In some embodiments, TecMux thread 106 can log an error in both a user log and an engineering log.

Figure 3:
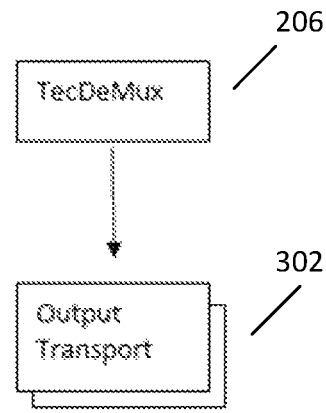
FIG. 3 depicts a high-level view of an output thread generation system.

FIG. 3 depicts a high-level view of TecDeMux thread(s) 206. In some embodiments, TecDeMux thread(s) 206 can create Output Transport thread(s) 302. TecDeMux thread(s) 206 can communicate configuration(s) to the Output Transport threads 302 via any know convenient and/or desired communication system and/or mechanism.

In some embodiments, TecDeMux thread(s) 206 can read TEC transport packets from the TEC card. The number of packets the TecDeMux thread(s) 206 can attempt to read can be based, at least in part, on the available space in the TEC transport packets ring buffer. When the associated pointer nears the top of the ring buffer, TecDeMux thread(s) can read the amount of data which can be limited by the top of the ring buffer.

Figure 4:
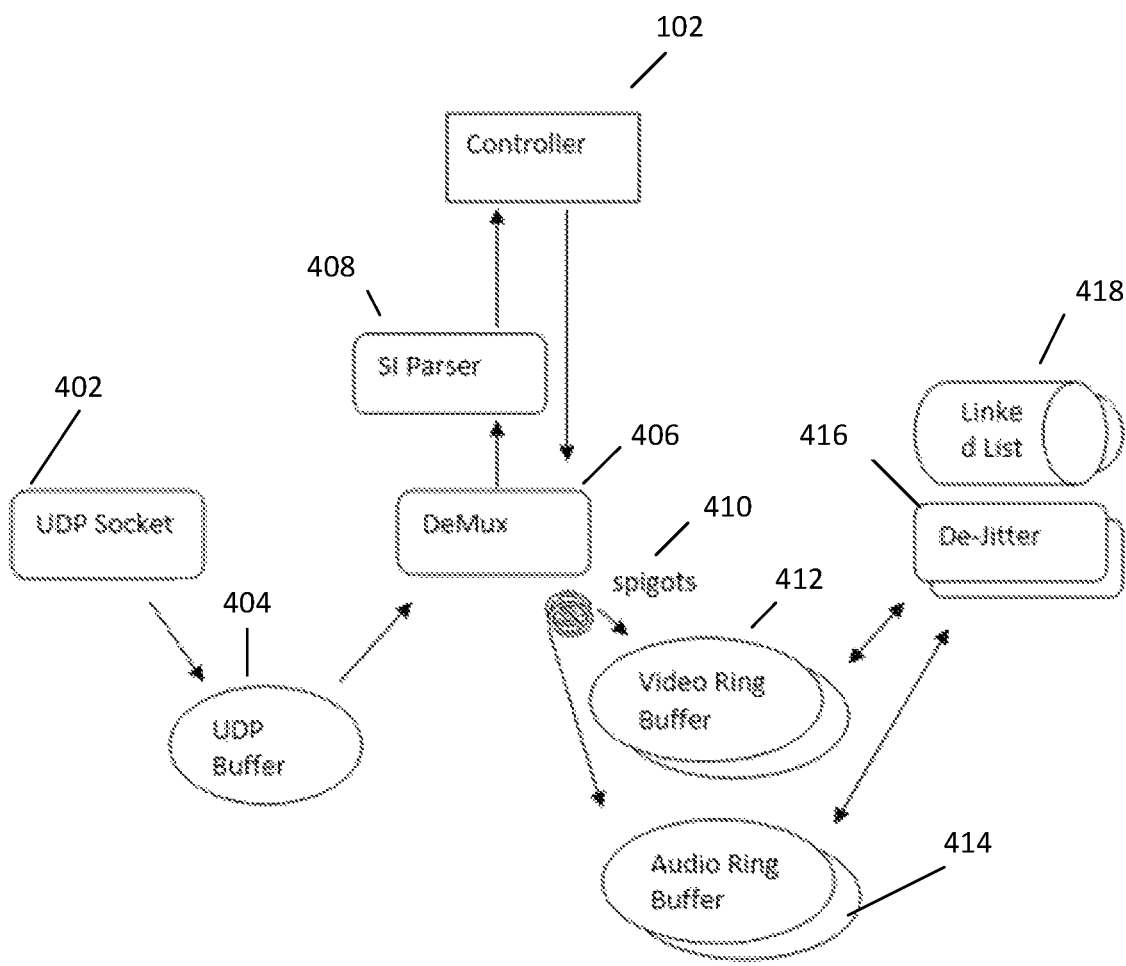
FIG. 4 depicts an input, de-multiplexing system.

FIG. 4 depicts an input, de-multiplexing system 400. In the embodiment depicted controller 102 can create an Input Transport thread 104 for each of one or more input transport streams. It can also create video TEC transport ring buffers 412 and an audio TEC transport packets ring buffers 414 for each output program(s). In some embodiments, each Input Transport thread 104 can contain a DeMux object 406 and one or more de-jitter objects 416. In operation, the DeMux 406 can de-multiplex an input transport stream and can copy the transport packets to the video or audio TEC transport packets ring buffers 412 414 of the output programs via a spigot 410. In some embodiments, the DeMux 406 can also attach a hardware time stamp to each PCR transport packet which can be obtain from the TEC card when the presence of a PCR transport packet is detected.

In the embodiment depicted in FIG. 4, a de-jitter 416 can be associated with an output program and can contain a link list 418. In some embodiments, the de-jitter 416 can sort the transport packets in the link list 418 in the order they arrived and can assign an arrival hardware time stamp for each transport packet(s).

In some embodiments the DeMux 406 can monitor the PSI tables and the controller 102 can configure which PIDs to monitor. Additionally, the SI Parser object 408 can parse the PID steams for the PSI tables and/or report any changes in the PSI tables to the controller 102. In some embodiments, the DeMux 406 may not copy the PSI PID streams to the TEC transport packets ring buffers 412 414 of the output programs.

In operation, DeMux 406 can monitor the transport stream and report the status to the Controller 102. Controller 102 can turn on or off the spigots 410 (associated with output program(s) based on the status received. If a spigot 410 is on, DeMux 406 can push the video transport packets to the video TEC transport packets ring buffer 412 of the output program and/or push the audio and data transport packets to the audio TEC transport packets ring buffer 414.

In some embodiment, DeMux 406 may not maintain or be aware of the relation between the primary and backup input transport streams as the controller 102 can maintain the relationship(s) and can turn on the primary spigot 410 and turns off the backup spigot 410, or vise versus, based, at least in part, on the status it received from the DeMux 406.

Additionally, DeMux 406 can attach a hardware time stamp (aka input hardware time stamp) to each PCR transport packet(s) which can be obtained from the TEC card when DeMux 460 detects a PCR transport packet. Moreover, in some embodiments, DeMux 406 can attach a NTP time stamp to each PCR transport packet(s) which can be obtained from the Linux server.

In further operation, DeMux 460 can copy transport packets (which, in some embodiments can be 188-bytes or any other known convenient or desired size) from the UDP buffer 404 and attach a Program Stream ID header (which can be 16 bytes or any other known, convenient or desired size) to each transport packets and push the TEC transport packets (which can be 204 bytes or any other known, convenient or desired size) to the TEC transport packets ring buffers 412 414 of the output programs.

In some embodiments, if the TEC transport packets ring buffers 412 414 are full, DeMux 460 can drop older packets to make room for the newer packets and can also log any error in either a user log or an engineering log or both and/or any other known, convenient and/or desired log. Accordingly, in some embodiments, the size of the video TEC transport packets ring buffer 412 can be 4096*7*204 bytes, such that it can hold 1 second of video TEC transport packets at a 40 Mbps transport rate and the size of the audio TEC transport packets ring buffer 414 can 256*7*204 bytes, such that it can hold 1 second of audio/data TEC transport packets at a 2.5 Mbps transport rate. However, in alternate embodiments the buffers 412 414 can be configured to hold any convenient and/or desired amounts of data at any convenient and/or desired transport rate.

In some embodiments, UDP (user datagram protocol) checksum verification can be offloaded to the NIC (network interface controller) card. The NIC can drop the UDP packet if a checksum error is detected. In such an event, DeMux 406 can detect error(s) in the continuity counter and can log any error(s) in a user log, an engineering log, both and/or any other known, convenient or desired log.

Figure 5:
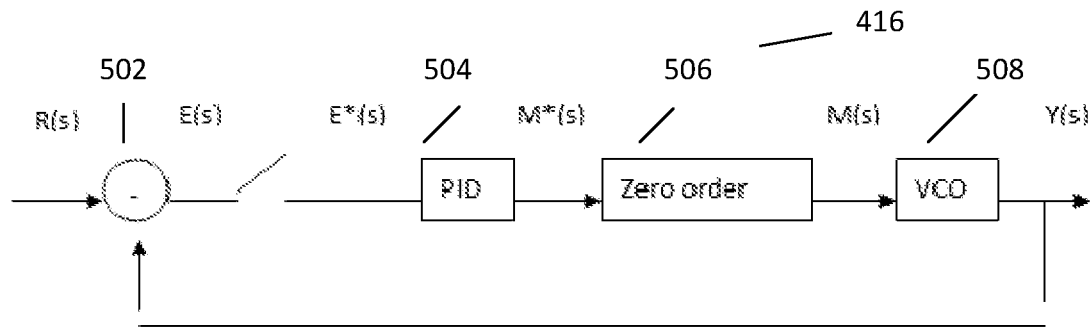
FIG. 5 depicts a high-level view of a de-jitter system.

FIG. 5 depicts a high-level view of a de-jitter system 416. In the embodiment depicted in FIG. 5, a de-jitter 416 can be associated with an output program. In some embodiments, de-jitter can contain a link list 418 and can sort the transport packets in the link list 418 in the order they arrived. The link list 418 can preserve the order of the video, audio, and data transport packets that otherwise may be lost during the de-multiplex process.

In operation, two or more output programs can be associated with an input program. In such instances, DeMux 406 can duplicate the transport packets from the input program to the multiple output programs and de-jitter 416 can treat an output program independently. Moreover, a de-jitter 416 can maintain an incarnation of the hardware clock from the TEC card and can implement a phase lock loop (PLL) to lock the incarnation of the hardware clock from the TEC card to the PCR. The PLL can produce an arrival hardware time stamp (aka output hardware time stamp) for each PCR transport packets in accordance with the following formulation:

The Transfer Function of a PID controller 504:

$$P(z) = K_P + K_D(1 - z^{-1}) + \frac{K_I}{1 - z^{-1}}$$

The Transfer Function of Zero order 506 hold.

$$\frac{1 - e^{-sT}}{s}$$

The Transfer Function of VCO 508: 1/s
The Close Loop Transfer Function $$\frac{Y(z)}{R(z)} = \frac{P(z)V(z)}{1 + P(z)V(z)}, V(z) = \frac{Tz^{-1}}{1 - z^{-1}}$$

The Output Time Stamp Frequency Modifier:

$$m[n]=(K_P+K_D+K_I)e[n]-(K_P+2K_D)e[n-1]+K_De[n-2]+m[n-1]$$

The Initial Conditions: m[n]=0, if n≤0; e[n]=0, if n≤0

In operation, after the system assigns the arrival hardware time stamps to the two consecutive PCR transport packets, de-jitter 416 can assign an arrival hardware time stamp to each transport packets between the two PCR transport packets in an equal interval fashion, such as $t_1, t_2 t_3 \ldots t_n$, where $t_1$ is the arrival hardware time stamp for the first PCR transport packet: $t_n$ is the arrival hardware time stamp for the second PCR transport packet and $t_2$ to $t_{n-1}$ are the arrival hardware time stamps for the transport packets between the two consecutive PCR transport packets.

In the embodiment depicted, the de-jitter 416 can add a constant delay of 350 ms (or any other convenient and/or desired delay) to the arrival hardware time stamps and store the time stamps in the Packet Schedule Time Stamp field in the Program Stream ID header. In some embodiments, de-jitter 416 can be an in-place process—that is it may not move the video and audio/data packets, noting that the arrival hardware time stamps are not the packet schedule time stamps. Packet schedule time stamps rather can be determined by the TsMux thread(s) 202.

Figure 6:
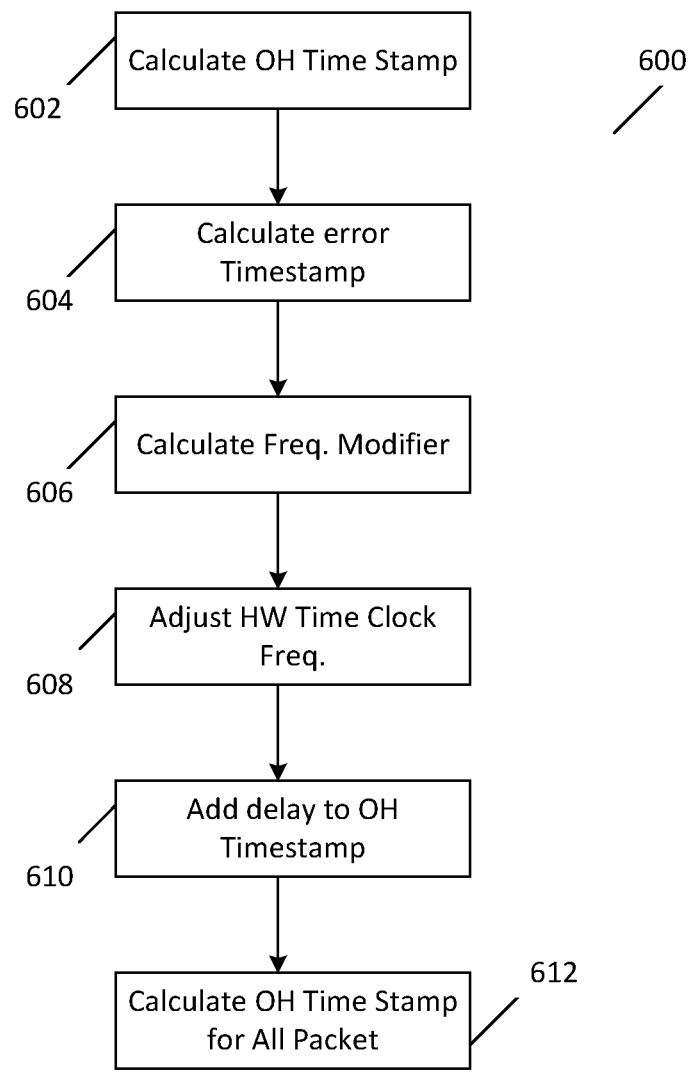
FIG. 6 depicts a high-level function block diagram of a de-jitter operation.

FIG. 6 depicts a high-level function block diagram 600 of a de-jitter 416 operation. For each transport packet, De-Jitter performs the followings:

Calculate the output hardware time stamp 602 y[n] according to the equations above related to FIG. 5.

Calculate an error time stamp 604 e[n]=input hardware time stamp–output hardware time stamp.

Calculate the frequency modifier 606 in accordance with any known, convenient and/or desired calculation method.

Adjust the hardware time clock frequency 608 in accordance with the frequency modifier calculated in step 606.

Add a constant delay 610 δ=350 ms to the output hardware time stamp of this PCR transport packet. However, in alternate embodiments the delay be any convenient and/or desired delay time.

Calculate the output hardware time stamps 612 of all transport packets between this PCR transport packet and previous PCR transport packet.

In some embodiments, if the error between the input hardware time stamp and the output hardware time stamp is greater than 250 ms (or other prescribed time), de-jitter 416 can reset the PLL and can log the error(s) in a user log, an engineering log, both or any convenient and/or desired log.

In operations, the settling time of the PLL in the embodiment depicted can be 50 minutes. Thus, assuming the maximum PCR offset is 810 Hz, the maximum delay between the input stream and the output stream is 45 ms.

Additionally, de-jitter 416 can also maintain an incarnation/instantiation of the system clock of the server and implement a separate PLL to lock the incarnation of the system clock of the server to the PCR. De-jitter 416 can also assign an arrival NTP time stamp to each transport packets in a similar fashion. However, the arrival NTP time stamps may not be used for the packet scheduling.

Figure 7:
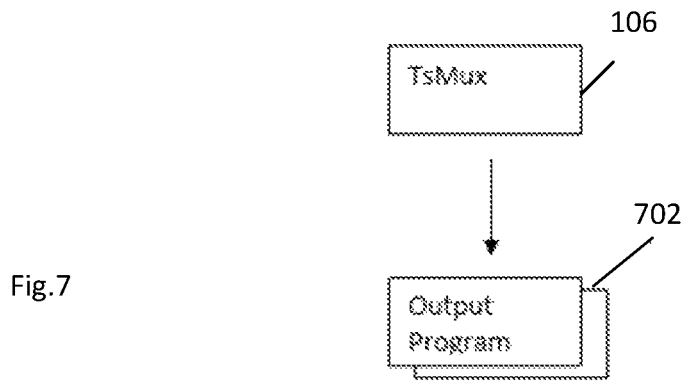
FIG. 7 depicts a high-level view of an output thread generation system.

FIG. 7 depicts a high-level view of the TsMux Thread(s) 202. In the embodiment depicted in FIG. 7, TecMux thread(s) 106 can create TsMux thread(s) 202 for each output transport stream(s). Additionally, in some embodiments, TecMux thread(s) 106 can allocate a NULL TEC transport packets ring buffer, a PCR only TEC transport packets ring buffer, and a SI table TEC transport packets ring buffer for each output transport streams and can also create a link list for each output transport stream(s). Additionally, TsMux thread(s) 202 can create an Output Program thread 702 for each output program(s) and TsMux thread(s) 202 can also create a link list for each output program(s).

In some embodiments, TsMux thread(s) 202 can contain or instantiate a ReMux object 808 and a SI Playout object wherein the ReMux object 808 can sort the audio/data transport packets in the order according to their arrival hardware time stamps. Additionally, the ReMux object 808 can sort the video transport packets based on vbv-delays (video buffering verifier) and can assign a packet schedule time stamp for each TEC transport packet(s). Moreover, SI Playout can create SI table transport packets and can push the packets in the SI table TEC transport packets ring buffer. And, the controller 102 can send the output SI tables to the TsMux thread 106. Finally, the Output Program thread 702 can re-calculate the PCR value for each PCR transport packet(s).

Figure 8:
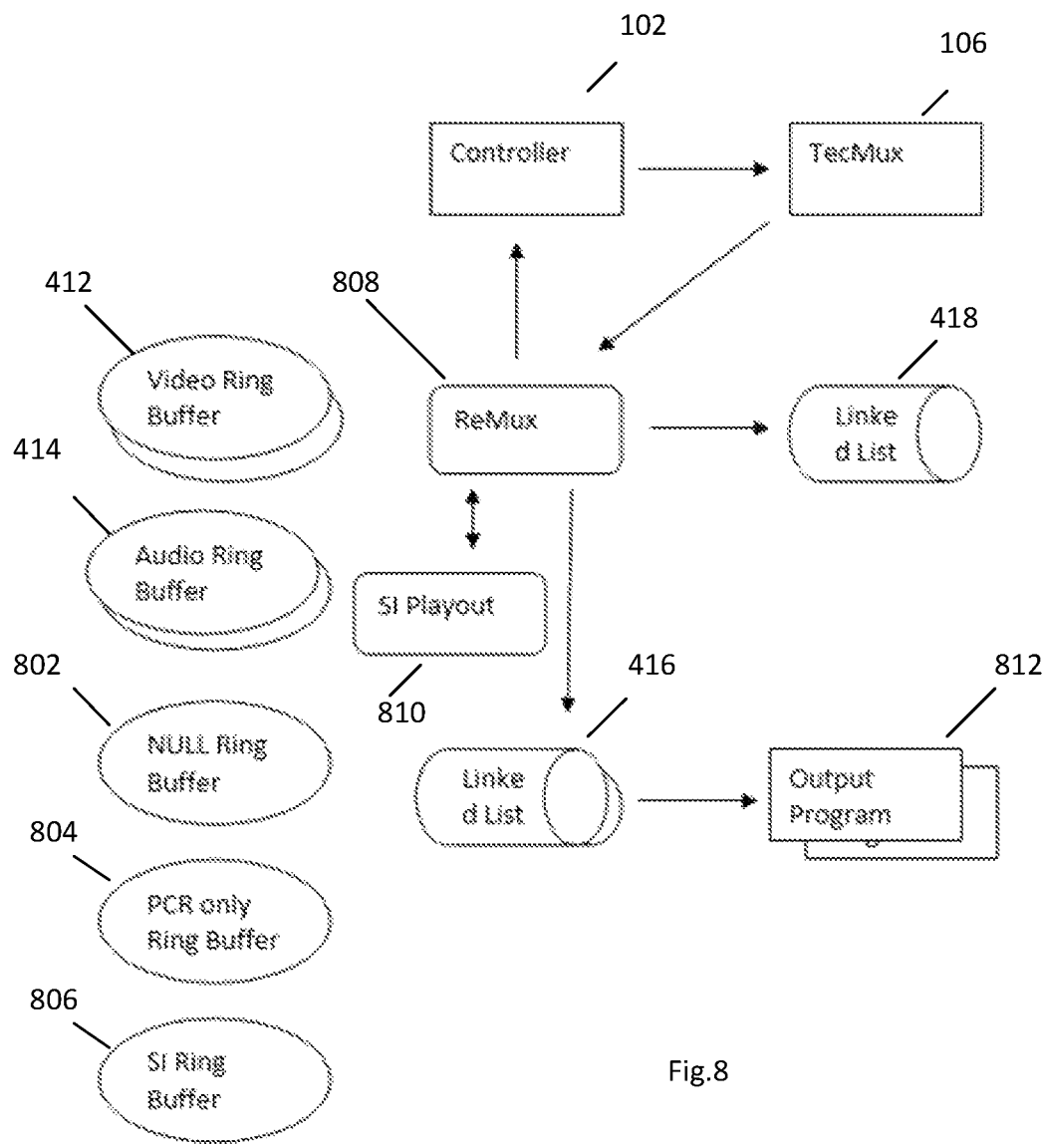
FIG. 8 depicts a schematic of a ReMux system.

FIG. 8 depicts a schematic of a ReMux system 800. In the embodiment depicted in FIG. 8, TsMux thread(s) 202 can maintain a packet schedule timer. Upon creation, TsMux thread(s) 202 can read the hardware time from the TEC card. TsMux thread(s) 202 can initialize the packet schedule timer to the hardware time and TsMux thread(s) 202 can also calculate the packet interval based on the output transport rate. Additionally, controller 102 can send the output transport rate configuration to TecMux thread(s) 106 which can deliver it to the TsMux thread(s) 106.

ReMux 808 schedules each output transport packets based on the packet schedule timer. ReMux 808 can maintain the order of the output transport packets in its link list 418. ReMux 808 can also assign a packet schedule time stamp for each output transport packet(s).

For each packet schedule time slot, ReMux 808 can insert a transport packet in its link list 418 and can increment the packet schedule time by the packet interval. ReMux 808 can maintain the transport packets in its link list 418 for a nominal 20 ms and/or any other convenient and/or desired time period. Additionally, ReMux 808 can schedule the output transport packet(s) in the following order:

ReMux 808 can read the hardware time from TEC card and add 20 ms (or any convenient and/or desired time period) to the hardware time.

ReMux 808 can insert a SI transport packet in its link list 418 based, at least in part, on the SI table intervals and controller 102 can send the SI tables along with the intervals to the TsMux 202 through TecMux 106.

ReMux 808 can insert an audio/data transport packet in its link list 418 if the arrival hardware time stamp is less than the packet schedule time and ReMux 808 can insert audio/data transport packets in the order based on the arrival hardware time stamps.

ReMux 808 can discard video transport packets whose arrival hardware time stamps are less than the packet schedule time—300 ms (or any other convenient and/or desired time interval). ReMux 808 can log the error into a user log, an engineering log, both or any other convenient and/or desired log. In some embodiments, ReMux 808 may not discard audio/data transport packets.

ReMux 808 can search the video transport packet with a minimum vbv-delay. The search can be performed on video transport packets whose arrival hardware time stamps are less than the packet schedule time and whose output video rates are less than the maximum configured video rates. If a minimum video transport packet is found, ReMux can insert the video transport packet in its link list 418. ReMux 808 can also insert a video transport packet in the link list 418 of the corresponding output program.

ReMux 808 can insert a PCR only transport packet in its link list if it has not detected a PCR packet for 40 ms (or any convenient and/or desired time period). ReMux 808 can also insert the PCR only transport packet in the link list 418 of the corresponding output program.

ReMux 808 can insert a NULL transport packet in its link list 418 if there is no other transport packet to be inserted.

In operation, for each timer period of the TsMux 202, ReMux 808 can read the hardware time from the TEC card.

Figure 9:
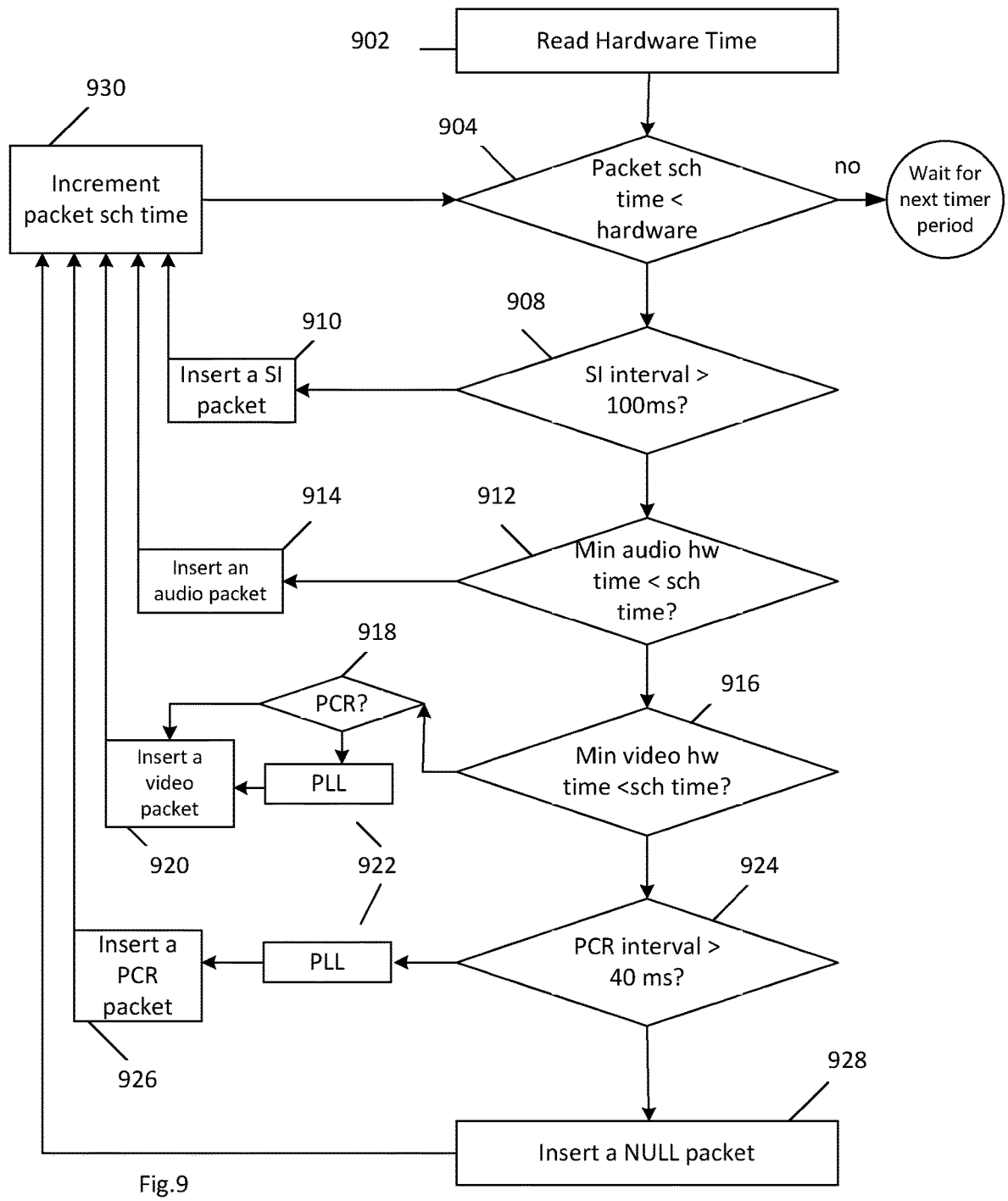
FIG. 9 depicts a high-level view of a multiplexing system

ReMux 808 can sort the output transport packets in its link list 418 based on the following flow diagram depicted in FIG. 9.

FIG. 9 depicts a high-level view of a multiplexing system 900. ReMux 808 can store the packet schedule time stamp in the Packet Schedule Time Stamp field in the Program Stream ID header. The packet schedule time stamp can overwrite the arrival hardware time stamp. ReMux 808 can be an in-place process, such that it does not move the video and audio/data transport packets.

In some embodiments, when ReMux 808 inserts a transport packet in the output transport stream, it pops the address of the transport packet from its TEC transport packets ring buffer 412 414 and stores the address in its link list 418. The packets in the link list 418 can stay in the ring buffer for up to 40 ms (or any convenient and/or desired time period).

The TEC transport packets ring buffers 412 414 can store 1 second (or any convenient and/or desired time period) of transport packets at maximum rates. The nominal time the packets stay in the ring buffers can be 350 ms (or any convenient and/or desired time period). Thus, by way of non-limiting example, assuming the maximum network delay is 150 ms, the transport packets can stay in the ring buffer for up to 500 ms.

In the case of TsMux 202 overrun, ReMux 808 can remove the video transport packets that have stayed in the ring buffers 412 for over 650 ms. Therefore, the transport packets in the link list 418 can remain in the ring buffer for 40 ms. After 40 ms, ReMux 808 can drop the transport packets from its link list 418 and can log the error in a user log, an engineering log, both or other storage log.

In operation, TsMux 202 can create an Output Program 702 thread for each output program(s). TsMux 202 can also create a link list 418 for each output program(s) 702. Additionally, when ReMux 808 inserts a video transport packet in the output transport stream, it can insert a video transport packet in the link list 418 of the corresponding output program 702.

ReMux 808 can store the arrival hardware time stamp, the packet schedule time stamp, and the address of the video transport packets in the link list 418 of the corresponding output program 702. Additionally, for each timer period, Output Program 702 thread can process all the video transport packets in its link list 418.

Output Program 702 thread can re-generate the PCR (aka output PCR) for the output program and Output Program 702 can implement a phase lock loop to lock the PCR clock to the arrival hardware time.

In operation, if the error between the input PCR time stamp and the output PCR time stamp is greater than 100 ms, Output Program 702 can reset the PLL and log any error(s) in a user log, an engineering log, both or other storage log. Output Program 702 thread also calculates the video output rate and ReMux 808 can use the video output rate for video packet scheduling as described in relation to the ReMux 808 operation.

Output Program 702 can extract the PTS/DTS and update the vbv-delay and ReMux 808 can use the vbv-delay for video packet scheduling as described in relation to the ReMux 808 operation.

For each output transport stream, ReMux 808 can sort the transport packets in its link list 418. However, ReMux may not move the transport packets but can store the addresses of the transport packets in its link list 418.

Controller 102 can allocate a vector of struct iovec for TecMux 106. Each struct iovec can hold an address of an output TEC transport packet. In some embodiments, the buffer can hold 16 ms of TEC transport packets at a predetermined transport rate. For each timer period, TecMux 106 can read the hardware time from TEC card and sort the output TEC transport packets from different output transport streams in the order based on the packet schedule time stamps. TecMux 808 can store the addresses of the transport packets in the vector of struct iovec and TecMux 808 can sort the TEC transport packets whose packet schedule time stamps are less than the hardware time. TecMux 808 can add 16 ms to the packet schedule time stamp and NTP time stamp for each output TEC transport packets. And TecMux 808 can write the transport ID to the 7 least significant bits of the Program Stream ID field in the Program Stream ID header.

TecMux 106 can use writev non-blocking system call to transfer the TEC transport packets sorted in the vector of struct iovec to the TEC card. In the case where TEC driver is unable to accept data, TecMux 106 can drop TEC transport packets to keep the data flow uninterrupted and can also log the error(s) in a user log, an engineering log, both and/or a convenient and/or desired log.

Controller 102 can allocate TEC transport packets ring buffers 412 414 for TecDeMux 106. In some embodiments, a buffer 412 414 can hold 20 ms TEC transport packets at a predetermined transport rate. Additionally, TecDeMux can use aio_read to transfer TEC transport packets from the TEC card to the TEC transport packets ring buffer. The number of packets TecDeMux may read can be based on the available space in the TEC transport packets ring buffer. TEC transport packets ring buffer can be a single writer and multiple readers ring buffer.

Additionally, in operation, TEC driver can write the TEC transport packets from the TEC card into the TEC transport packets ring buffer. Output Transport threads can read the TEC transport packets from the TEC transport packets ring buffer and send the transport packets to the egress. In some embodiments, each Output Transport thread can be a reader of the TEC transport packets ring buffer and Output Transport can identify the output transport packets through the transport ID in the Program Stream ID header.

For each timer period, Output Transport can read the hardware time from the TEC card and if there are at least 7 TEC transport packets in the TEC transport packets ring buffer whose packet schedule time stamps are less than the hardware time, Output Transport can write 7 transport packets to the egress in one UDP datagram. In some embodiments, Output Transport thread uses writev system call to transfer transport packets to the egress. OutputTransport thread can strip off the Program Stream ID header of the TEC transport packets using writev system call. Moreover, in some embodiments, Output Transport thread may not copy the transport packets from the TEC transport packets ring buffer to another buffer prior to writing them to the egress. In some embodiments, Output Transport thread can write the output transport packets to the egress in the order based on the packet schedule time stamps and Output Transport can hold a nominal of 16 ms of transport packets in the TEC transport packets ring buffer. In some embodiments, a UDP checksum calculation can be offloaded to the NIC card.

As depicted in FIG. 9, in step 902 a hardware time can be read and a fixed period, such as 20 ms can be added. Then in step 904 packet schedule time can be compared with the hardware time. If the packet schedule time is greater than or equal to the hardware time, the system can proceed to step 906 and the system can wait for the next timer period. If the packet schedule time is less than the hardware time, the system can proceed to step 908 in which the SI interval is evaluated to determine if is less than a prescribed value (100 ms in the exemplary embodiment depicted in FIG. 9). If the SI interval value is greater that the prescribed value, then the system can proceed to step 910 and insert an SI packet and increment the packet schedule time in step 1030. However, if the SI packet is not greater that the prescribed value, then the system can proceed to step 912.

In step 912 the minimum audio hardware time and the schedule time are evaluated. If the minimum audio hardware time is less than the schedule time, then an audio packet can be inserted in the output in step 914 and the packet schedule time can be adjusted accordingly in step 1030. However, if the minimum audio hardware time is not less than the schedule time, then the system can proceed to step 916.

In step 916 the minimum video hardware time and the schedule time are evaluated. If the minimum video hardware time is less than the schedule time, then a video packet can be evaluated for PCR in step 918. If PCR is detected in step 918, de-jitter of the video can be performed in step 922 and the de-jittered video can be inserted in the output in step 920 and the packet schedule time can be adjusted accordingly in step 930. If PCR is not detected in step 918, then in step 922 the video can be inserted in the output in step 920 and the packet schedule time can be adjusted accordingly in step 930. However, if the minimum video hardware time is not less than the schedule time, then the system can proceed to step 924.

In step 924 the PCR interval is evaluated. If the PCR interval is greater than a prescribed value (40 ms in the example provided in FIG. 9), then the process can proceed to step 922 and a de-jitter operation can be performed on the PCR packet prior to delivery to step 926 in which the PCR only packet can be inserted in the output and the packet schedule time can be adjusted accordingly in step 930. If the PCR interval is not greater than a prescribed value (40 ms in the example provided in FIG. 9), then in step 928 a NULL packet can be inserted in the output and the packet schedule time can be adjusted accordingly in step 930.

Figure 10:
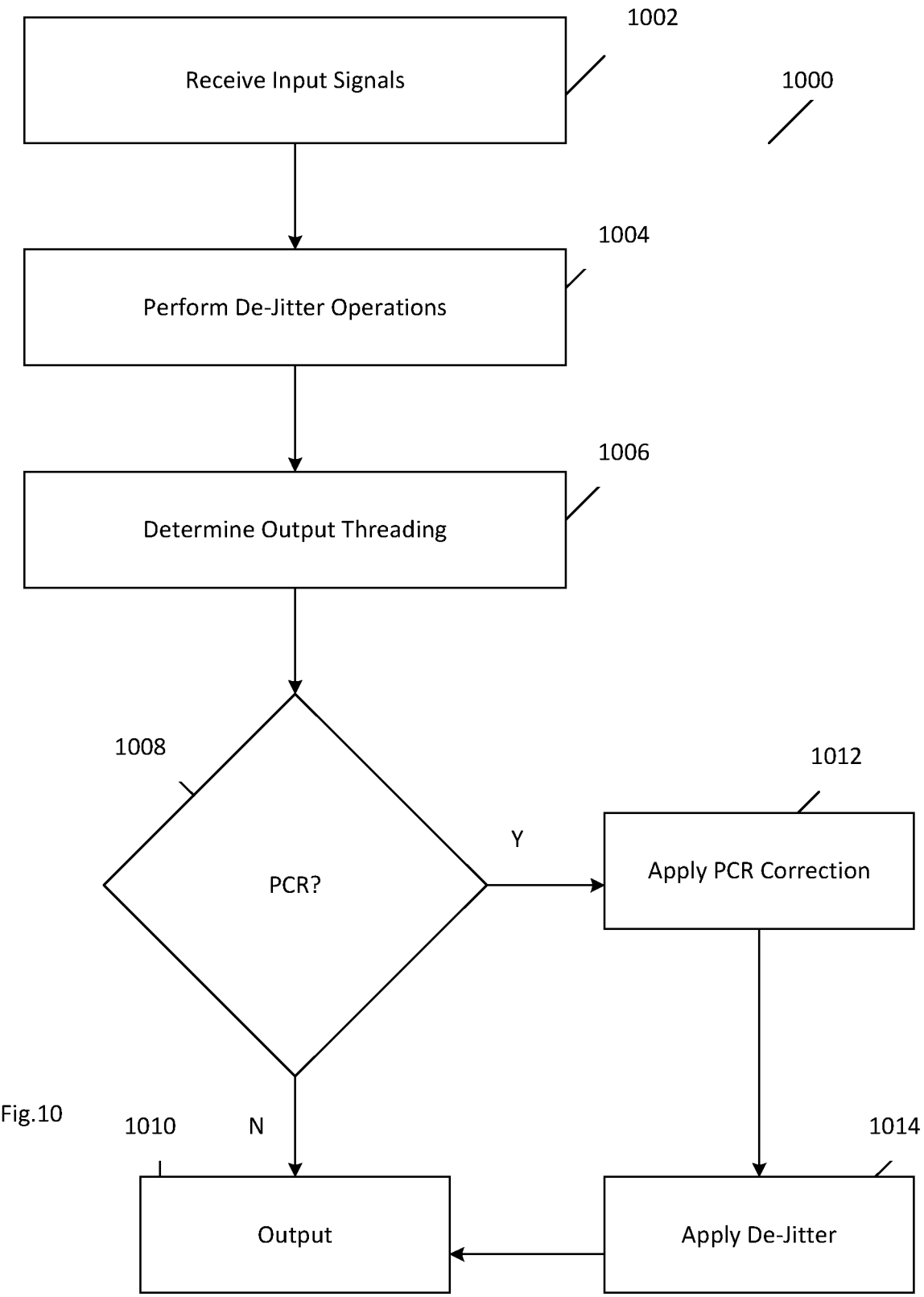
FIG. 10 depicts a high-level view of a two-stage de-jitter multiplexer

FIG. 10 depicts a high-level view of a two-stage de-jitter multiplexer 1000. In step 1002 an input signal can be received and then in step 1004 a de-jitter operation can be performed on the signal, in some embodiments via a PLL and related timestamps on packets can be modified. Then in step 1006 output sequencing for the Mux operation can be determined. In step 1008 the output packet values can be evaluated. If PCR correction is indicated, PCR correction can be applied to the output packet in step 1012 and a second de-jitter operation can be applied in step 1014 and the packets can be output in step 1010. If PCR correction is not indicated in step 1008, the packets can be sent directly to output in step 1010.

Figure 11:
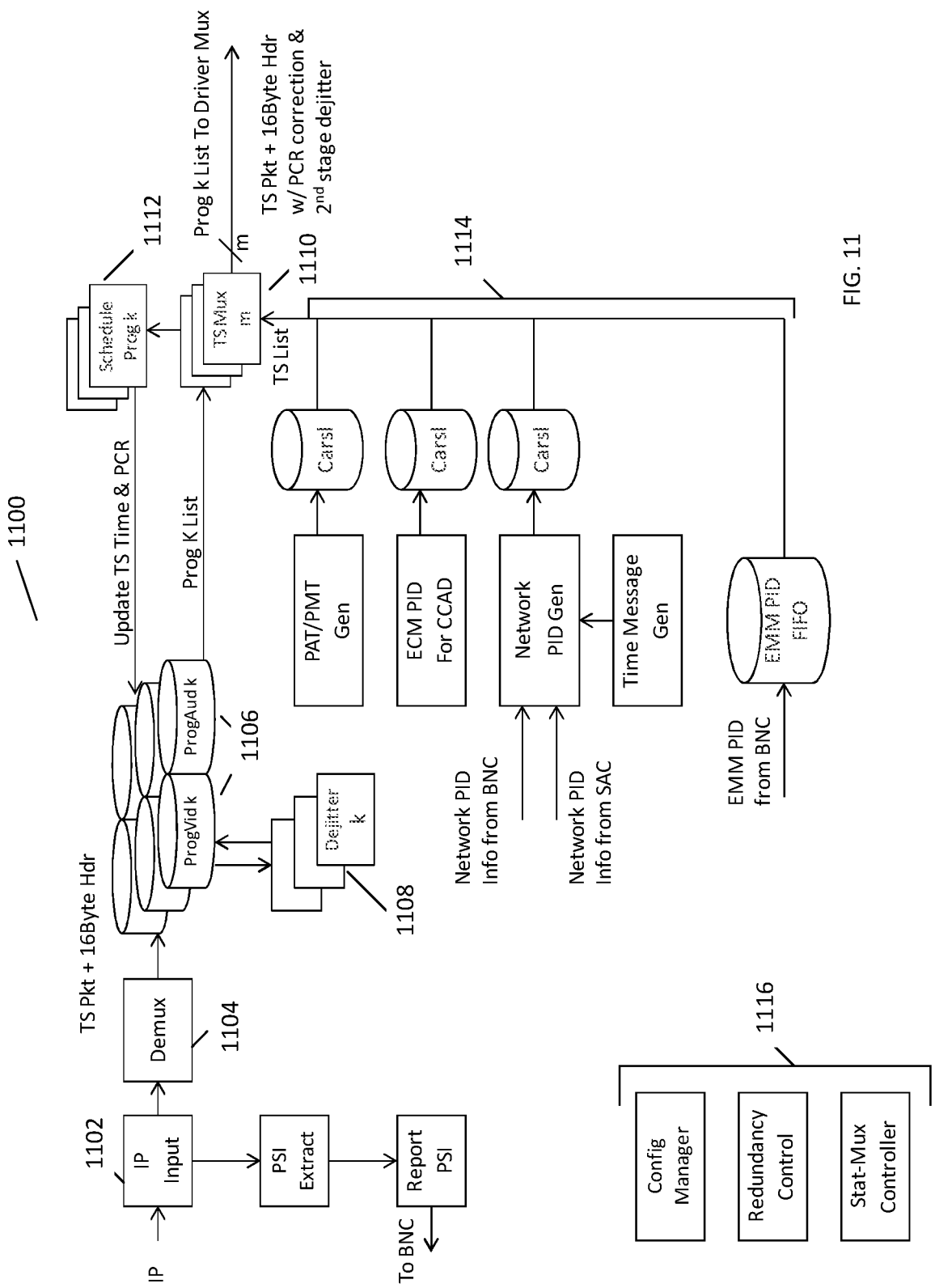
FIGS. 11-12b depict a schematic of a multiplexing system.
Figure 12A:
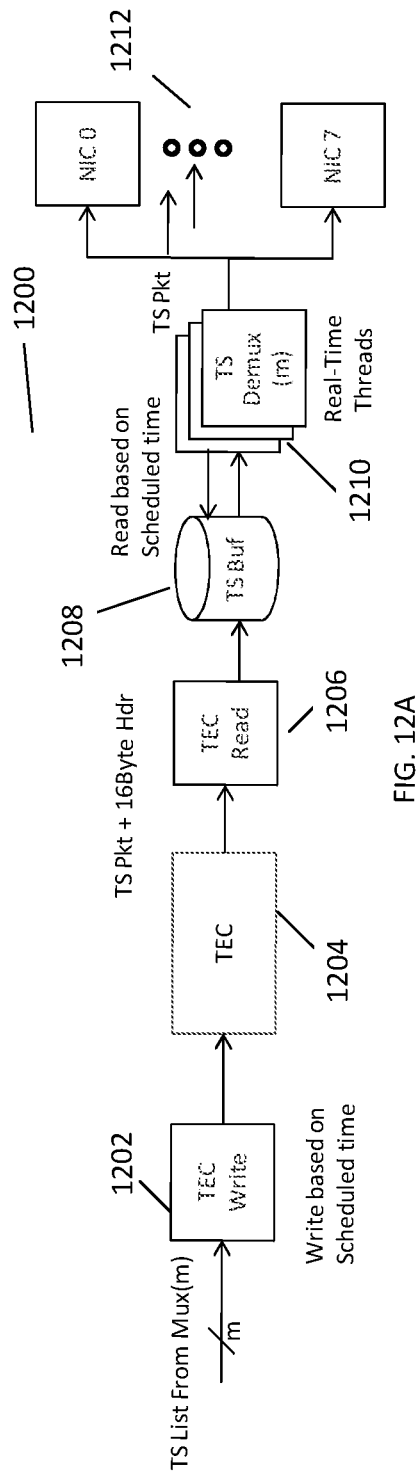
Figure 12B:
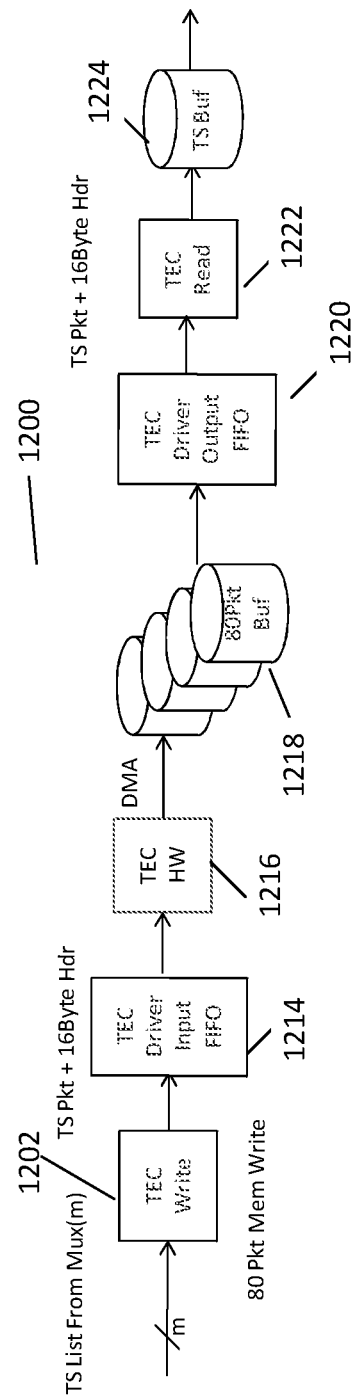

FIGS. 11-12*b* depict a schematic of a multiplexing system 1100. In the embodiment depicted in FIGS. 11-12*b* the system can receive an IP input stream 1102 and perform a DeMux operation 1104 on the IP input stream 1102 to separate individual programming into video and audio components 1106. De-jitter 1108, in the form of a PLL, can be applied to the separated programming video an updated programming list can be generated and directed to the TSMux 1110. Packet programming received by the TSMux can be evaluated for the presence of PCR modification. If PCR modifications are detected, then the relevant time stamps can be updated and a second pass de-jitter can be performed on the modified packet at program schedule 1112 and the de-jittered packet can be returned to the TSMux 1110 for encoding and transmission in accordance with the systems and processes depicted in FIGS. 12a and 12b. Additionally, in some embodiments various interface device 1114 configuration information can also be received by the TSMux 1110 for use in packet scheduling. Moreover, in some embodiments, control systems 1116 can be enabled to detect, address, update and/or respond to issues detected during the multiplexing process.

FIGS. 12a and 12b depict systems 1200 for delivery of multiplexed signals generated in accordance with the system and method of FIG. 11. In step 1202 a TEC write operation can be performed, based on the delivery process selected. In some embodiments, a TEC 1204 can perform a hardware read 1206 and then transmit packets to a TS buffer 1208 prior to delivery to a DeMux 1210 and then de-multiplexed signals can be transmitted via one or more network interface cards (NIC) 1212. In alternate embodiments, the TS List from the TSMux 1110 can perform FIFO forwarding 1214 to the TEC hardware 1216 and packets can then be buffered 1218 prior to delivery to a FIFO TEC driver 1220 for output. Following these steps a TEC hardware read 1222 can be performed prior to transmission of the signal to a TS Buffer 1224 before delivery of the signals.

Figure 13:
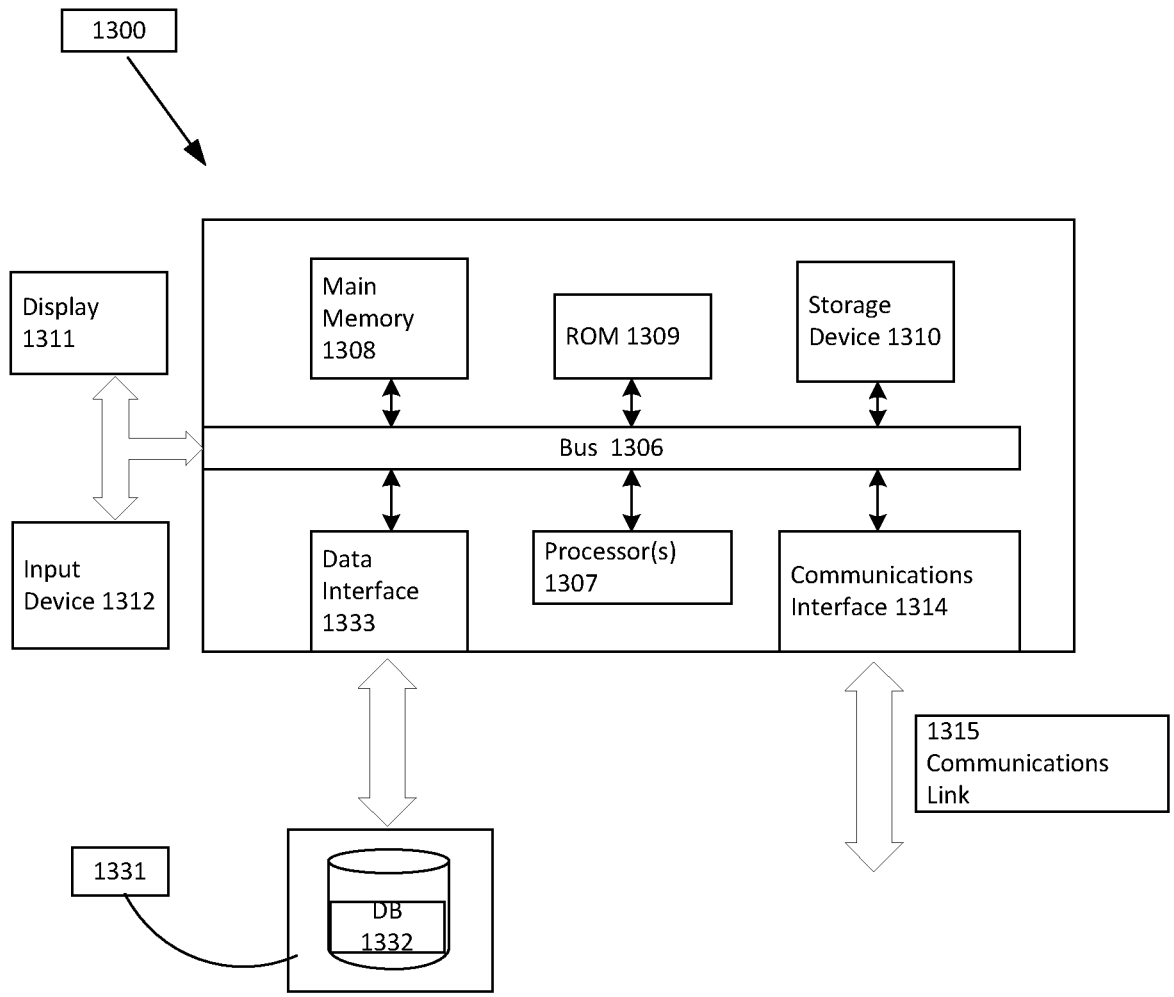
FIG. 13 depicts a system for implementation of a two-stage de-jitter multiplexer.

The execution of the sequences of instructions required to practice the embodiments can be performed by a computer system 1300 as shown in FIG. 13. In an embodiment, execution of the sequences of instructions is performed by a single computer system 1300. According to other embodiments, two or more computer systems 1300 coupled by a communication link 1315 can perform the sequence of instructions in coordination with one another. Although a description of only one computer system 1300 will be presented below, however, it should be understood that any number of computer systems 1300 can be employed to practice the embodiments.

A computer system 1300 according to an embodiment will now be described with reference to FIG. 13, which is a block diagram of the functional components of a computer system 1300. As used herein, the term computer system 1300 is broadly used to describe any computing device that can store and independently run one or more programs.

Each computer system 1300 can include a communication interface 1314 coupled to the bus 1306. The communication interface 1314 provides two-way communication between computer systems 1300. The communication interface 1314 of a respective computer system 1300 transmits and receives electrical, electromagnetic or optical signals, that include data streams representing various types of signal information, e.g., instructions, messages and data. A communication link 1315 links one computer system 1300 with another computer system 1300. For example, the communication link 1315 can be a LAN, in which case the communication interface 1314 can be a LAN card, or the communication link 1315 can be a PSTN, in which case the communication interface 1314 can be an integrated services digital network (ISDN) card or a modem, or the communication link 1315 can be the Internet, in which case the communication interface 1314 can be a dial-up, cable or wireless modem.

A computer system 1300 can transmit and receive messages, data, and instructions, including program, i.e., application, code, through its respective communication link 1315 and communication interface 1314. Received program code can be executed by the respective processor(s) 1307 as it is received, and/or stored in the storage device 1310, or other associated non-volatile media, for later execution.

In an embodiment, the computer system 1300 operates in conjunction with a data storage system 1331, e.g., a data storage system 1331 that contains a database 1332 that is readily accessible by the computer system 1300. The computer system 1300 communicates with the data storage system 1331 through a data interface 1333. A data interface 1333, which is coupled to the bus 1306, transmits and receives electrical, electromagnetic or optical signals, that include data streams representing various types of signal information, e.g., instructions, messages and data. In embodiments, the functions of the data interface 1333 can be performed by the communication interface 1314.

Computer system 1300 includes a bus 1306 or other communication mechanism for communicating instructions, messages and data, collectively, information, and one or more processors 1307 coupled with the bus 1306 for processing information. Computer system 1300 also includes a main memory 1308, such as a random access memory (RAM) or other dynamic storage device, coupled to the bus 1306 for storing dynamic data and instructions to be executed by the processor(s) 1307. The main memory 1308 also can be used for storing temporary data, i.e., variables, or other intermediate information during execution of instructions by the processor(s) 1307.

The computer system 1300 can further include a read only memory (ROM) 1309 or other static storage device coupled to the bus 1306 for storing static data and instructions for the processor(s) 1307. A storage device 1310, such as a magnetic disk or optical disk, can also be provided and coupled to the bus 1306 for storing data and instructions for the processor(s) 1307.

A computer system 1300 can be coupled via the bus 1306 to a display device 1311, such as, but not limited to, a cathode ray tube (CRT) or a liquid-crystal display (LCD) monitor, for displaying information to a user. An input device 1312, e.g., alphanumeric and other keys, is coupled to the bus 1306 for communicating information and command selections to the processor(s) 1307.

According to one embodiment, an individual computer system 1300 performs specific operations by their respective processor(s) 1307 executing one or more sequences of one or more instructions contained in the main memory 1308. Such instructions can be read into the main memory 1308 from another computer-usable medium, such as the ROM 1309 or the storage device 1310. Execution of the sequences of instructions contained in the main memory 1308 causes the processor(s) 1307 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1307. Such a medium can take many forms, including, but not limited to, non-volatile, volatile and transmission media. Non-volatile media, i.e., media that can retain information in the absence of power, includes the ROM 1309, CD ROM, magnetic tape, and magnetic discs. Volatile media, i.e., media that cannot retain information in the absence of power, includes the main memory 1308. Transmission media includes coaxial cables, copper wire and fiber optics, including the wires that comprise the bus 1306. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof.

It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object-oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed is:

1. An apparatus configured to receive a plurality of input signals, each comprising a plurality of packets, the apparatus comprising a processor configured to:
   perform a first dejitter operation in a first stage on each of said plurality of input signals, said dejitter operation comprising a first phase locked loop using Program Clock Reference (PCR) as a reference to produce a plurality of modified input signals output from the first stage; and
   perform a second dejitter operation on each of said plurality of input signals, said dejitter operation comprising a second phase locked loop using packet arrival time from the first stage as a reference.

2. The apparatus of claim 1 wherein said first de-jitter operation modifies an input time stamp.

3. The apparatus of claim 1 where the first phase locked loop is faster than the second phase locked loop.

* * * * *